US011334896B2

(12) United States Patent
Dutt et al.

(10) Patent No.: US 11,334,896 B2
(45) Date of Patent: May 17, 2022

(54) SYSTEMS AND METHODS OF REAL-TIME PROCESSING

(71) Applicant: Capital One Services, LLC, McLean, VA (US)

(72) Inventors: Rajsaday Dutt, McLean, VA (US); Jinlian Wang, McLean, VA (US); Sharifa Monawer, New York, NY (US); Christopher Urban, Fairfax, VA (US); Scott Nimmer, McLean, VA (US); Faheem Rahman, McLean, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 16/387,064

(22) Filed: Apr. 17, 2019

(65) Prior Publication Data

US 2020/0334678 A1   Oct. 22, 2020

(51) Int. Cl.
*G06Q 40/06* (2012.01)
*G06Q 20/40* (2012.01)
*G06F 16/2457* (2019.01)

(52) U.S. Cl.
CPC ..... *G06Q 20/405* (2013.01); *G06F 16/24575* (2019.01)

(58) Field of Classification Search
CPC ........................ G06Q 20/405; G06F 16/24575
(Continued)

(56) References Cited

U.S. PATENT DOCUMENTS

| 7,319,986 B2 | 1/2008 | Praisner et al. |
| 2010/0042525 A1* | 2/2010 | Cai ........................ G06Q 40/12 705/35 |

(Continued)

FOREIGN PATENT DOCUMENTS

KR   20170138242 A   * 12/2017

OTHER PUBLICATIONS

Ossama H. Embarak, A two-steps prevention model of ATM frauds communications., Nov. 1, 2018, IEEE, web, 306-310 (Year: 2018).*
(Continued)

*Primary Examiner* — I Jung Liu
(74) *Attorney, Agent, or Firm* — Troutman Pepper Hamilton Sanders LLP; Christopher J. Forstner; John A. Morrissett

(57) ABSTRACT

A method including: receiving a purchasing policy; receiving, from a transaction terminal, a transaction authorization request including transaction authorization data associated with an attempted purchase made using a transaction card; determining, based on the transaction authorization data, purchase data; receiving a user profile corresponding to a user, associated with the transaction card, and past purchasing behavior data of the user; responsive to determining, based a comparison of the purchasing policy, the purchase data and the user profile, that the attempted purchase is suspicious, generating an attestation request; transmitting, to a user device associated with the user, the attestation request; receiving, from the user device, attestation data; and responsive to determining that the attestation data indicates that the attempted purchase comports with the purchasing policy, transmitting, to the transaction terminal, a transaction authorization approval to allow the attempted purchase.

19 Claims, 5 Drawing Sheets

(58) Field of Classification Search
USPC .............................................. 705/44, 41, 35
See application file for complete search history.

(56) References Cited

U.S. PATENT DOCUMENTS

| | | | |
|---|---|---|---|
| 2010/0070424 A1 | 3/2010 | Monk | |
| 2012/0158585 A1* | 6/2012 | Ganti ................. | G06Q 20/4016 |
| | | | 705/44 |
| 2014/0006275 A1* | 1/2014 | Hanson .............. | G06Q 20/3223 |
| | | | 705/41 |
| 2016/0283945 A1* | 9/2016 | Gonzalez ............... | G06Q 40/02 |
| 2016/0300216 A1* | 10/2016 | Godsey .............. | G06Q 20/4016 |
| 2018/0068309 A1* | 3/2018 | Mahaffey ............. | G06Q 20/401 |

OTHER PUBLICATIONS

International Search Report and Written Opinion in related PCT Application No. PCT/US2020/024153, dated May 18, 2020.
International Preliminary Report on Patentability in related PCT Application No. PCT/US2020/024153 dated Oct. 28, 2021.

* cited by examiner

SYSTEMS AND METHODS OF REAL-TIME PROCESSING

FIELD

The disclosed technology generally relates to processing, and, more particularly, systems and methods for real-time transaction processing based on policy statuses.

BACKGROUND

Many organizations provide employees with purchasing authority subject to spending policies. For example, organizations may pay for business-based travel, but do not authorize alcohol or entertainment expenses. However, in the related art, such noncompliant purchases are not easily detectable at the time of purchase. Rather, noncompliant transactions are typically only discoverable based on a manual, post-hoc review. Such a review is often reliant on managers who are unfamiliar with lengthy policies, and unfamiliar with what would be a reasonable charge. Moreover, reviewing transactions and applying spending policies creates numerous overhead expenses diverting resources from more productive uses. Related art transaction processing also relies on aggregate transactions (as opposed to itemized) and fails to identify many noncompliant purchases. Moreover, if a transaction is belatedly identified as noncompliant, the charges may only be recoverable through pay-deductions, which is limited to current employees and lowers employee morale.

As a non-limiting example, when an employee is travelling for business, their employer will typically pay for a hotel room and dining expenses. A charge to the room may be allowable dining expenses (e.g., room service or charge to room at a hotel restaurant) or unauthorized alcohol or entertainment expenses (e.g., pay-per-view movies). However, when the transaction occurs, the company may only be able to identify an incoming charge from the hotel and not the specific purchases. Thus, the noncompliant transaction would be incorrectly authorized.

Therefore, there is a need for improved systems and methods to provide transaction validation and policy checking in real-time at the time of sale. Certain aspects of the present disclosure attempt to address these and other issues.

BRIEF SUMMARY

Certain disclosed embodiments provide systems and methods for transaction authorization and time of sale policy validation.

According to some embodiments, there is provided a method including: receiving a purchasing policy; receiving, from a transaction terminal (e.g., merchant POS device), a transaction authorization request, the transaction authorization request including transaction authorization data associated with an attempted purchase made using a transaction card; determining, based on the transaction authorization data, purchase data including: an amount of the attempted purchase; and a classification of the attempted purchase; receiving a user profile corresponding to a user, the user profile being associated with the transaction card and including data representative of past purchasing behavior of the user; responsive to determining, based a comparison of the purchasing policy, the purchase data and the user profile, that the attempted purchase is suspicious, generating an attestation request including a request for evidence sufficient to show that the attempted purchase comports with the purchasing policy; transmitting, to a user device associated with the user, the attestation request; receiving, from the user device, attestation data; and responsive to determining that the attestation data indicates that the attempted purchase comports with the purchasing policy, transmitting, to the merchant POS device, a transaction authorization approval to allow the attempted purchase.

The method may further include, responsive to determining that the attestation data fails to indicate that the attempted purchase comports with the purchasing policy, transmitting, to the merchant POS device, a transaction authorization rejection to deny the attempted purchase.

The method may further include: responsive to determining that the attestation data fails to indicate that the attempted purchase comports with the purchasing policy, transmitting, to the user device, an alternative payment request message representing a request to process the attempted purchase using a personal account of the user; responsive to receiving, from the user device, a personal payment acceptance message, transmitting, to the merchant POS device, an alternative transaction authorization approval to allow the attempted purchase using the personal account of the user; and responsive to receiving, from the user device, a personal payment rejection message, transmitting, to the merchant POS device, a transaction authorization rejection to deny the attempted purchase.

The user profile may include an indication of previous suspicious activity in association with a first classification of purchase.

Determining that the attempted purchase is suspicious may include: determining that the classification of the attempted purchase matches the first classification; and determining that the amount of the attempted purchase falls within a predetermined range of amounts.

The attestation request may further include a request for an image of an invoice associated with the attempted purchase and the attestation data includes a digital image of an invoice obtained from the user device.

Determining that the attestation data shows that the attempted purchase comports with the purchasing policy may include: responsive to performing optical character recognition on the digital image of the invoice, identifying one or more purchased items; and determining that the one or more purchased items are not restricted by the purchasing policy.

The attestation data may include an email from a merchant associated with the attempted purchase.

Determining that the attempted purchase is suspicious may include: receiving, from the user device, location data indicative of a location of the user; determining, based on the transaction authorization request, a location of a merchant associated with the attempted purchase; and determining, that the location of the user is more than a threshold distance away from the location of the merchant associated with the attempted purchase.

The method may further include receiving, via an API of a merchant associated with the attempted purchase, additional purchase data associated with the attempted purchase, the additional purchase data including a list of one or more items or services and respective costs of each of the one or more items or services.

Determining that the attempted purchase is suspicious may further include determining that at least one item or service of the one or more items or services is listed as prohibited by the purchasing policy.

The method may further include receiving, via a software application executed on the user device and in response to the software application being used in association with the attempted purchase, additional purchase data associated with the attempted purchase, the additional purchase data including a list of items or services and respective costs of each.

According to some embodiments, there is provided a method of administering an organizational purchasing policy, the method including: receiving a purchasing policy; receiving, via a software application of a user device associated with a user, purchase explanation data, the purchase explanation data representing a purported reason that an attempted purchase made with a transaction card complies with the purchasing policy; receiving, from a merchant point-of-sale (POS) device, a transaction authorization request, the transaction authorization request including transaction authorization data associated with the attempted purchase made using the transaction card; determining, based on the transaction authorization data, purchase data including: an amount of the attempted purchase; and a classification of the attempted purchase; responsive to determining, based a comparison of the purchasing policy, the purchase data and the purchase explanation data, that the attempted purchase is suspicious, generating an attestation request for evidence sufficient to show that the attempted purchase comports with the purchasing policy; transmitting, to the user device, the attestation request; receiving, from the user device, attestation data; and responsive to determining that the attestation data indicates that the attempted purchase comports with the purchasing policy, transmitting, to the merchant POS device, a transaction authorization approval to allow the attempted purchase.

The purchase explanation data may include at least one from among an indication of an event, a list of participants, and an itemized list of expenses.

Determining that the attempted purchase is suspicious may include: determining an event location associated with the event; receiving location data from a plurality of mobile devices, wherein each of the plurality of the mobile devices is associated with an individual corresponding to the list of participants; and determining that one or more of the plurality of mobile devices was not present within a predetermined proximity of the event location within a time window associated with the event.

The method may further include determining the event location and the time window from a calendar program associated with the user device.

The method may further include: determining a list of attendees to an event based on electronic reservation or RSVP responses to an electronic invite to the event, wherein each electronic RSVP corresponds to an attendee; and comparing the list of attendees to the list of participants.

The method may further include: receiving additional purchase data associated with the attempted purchase, the additional purchase data including an identification at least selected one item and an associated cost; and responsive to determining, based on a comparison of the purchasing policy, the purchase data, additional purchase data and/or the purchase explanation data, that the associated cost of the at least one selected item is above a predetermined threshold associated with the classification of the attempted purchase, transmit, to the user device, an alternative purchase recommendation representing an alternative item that may be purchased for less than the associated cost of the at least one selected item.

According to some embodiments, there is provided a method of administering an organizational purchasing policy, the method including: receiving a purchasing policy; receiving, from a merchant POS device, a transaction authorization request, the transaction authorization request including transaction authorization data associated with an attempted purchase made using a transaction card; determining, based on the transaction authorization data, purchase data including: an amount of the attempted purchase; and a classification of the attempted purchase; receiving a user profile corresponding to a user, the user profile being associated with the transaction card, the user profile including data representative of past purchasing behavior of the user; responsive to determining, based a comparison of the purchasing policy, the purchase data and the user profile, that the attempted purchase is suspicious, generating an attestation request including a request for evidence sufficient to show that the attempted purchase comports with the purchasing policy and an authentication request to authenticate the user; transmitting, to a user device associated with the user, the attestation request and the authentication request; receiving, from the user device, attestation data and authentication data; and responsive to determining that the attestation data indicates that the attempted purchase comports with the purchasing policy and that the authentication data authenticates the user, transmitting, to the merchant POS device, a transaction authorization approval to allow the attempted purchase.

The authentication data may include biometric data of the user obtained by the user device; and determining that the authentication data authenticates the user includes comparing the biometric data of the user obtained by the user device to stored biometric data associated with the user.

Other implementations, features, and aspects of the disclosed technology are described in detail herein and are considered a part of the claimed disclosed technology. Other implementations, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein.

DETAILED DESCRIPTION

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

According to some embodiments, there is provided systems and methods for implementing purchasing policy in real-time. For example, in some cases, a system identifies an incoming pending transaction, determines that the transaction is suspicious, and requests attestation data from a user device before authorizing the transaction. The user device may provide the attestation information (e.g., biometric data, real-time approval, multi-factor authentication, and/or an invoice or bill of goods/services), which may be used to confirm the purchase comports to a purchasing policy. In some cases, a user device must also provide authentication data to authenticate a user of the user device. The purchasing policy may be adaptable such that users with past activity that does not comport to the purchasing policy are more highly scrutinized.

Reference will now be made in detail to example embodiments of the disclosed technology, examples of which are illustrated in the accompanying drawings and disclosed herein. Wherever convenient, the same references numbers will be used throughout the drawings to refer to the same or like parts.

Figure 1:
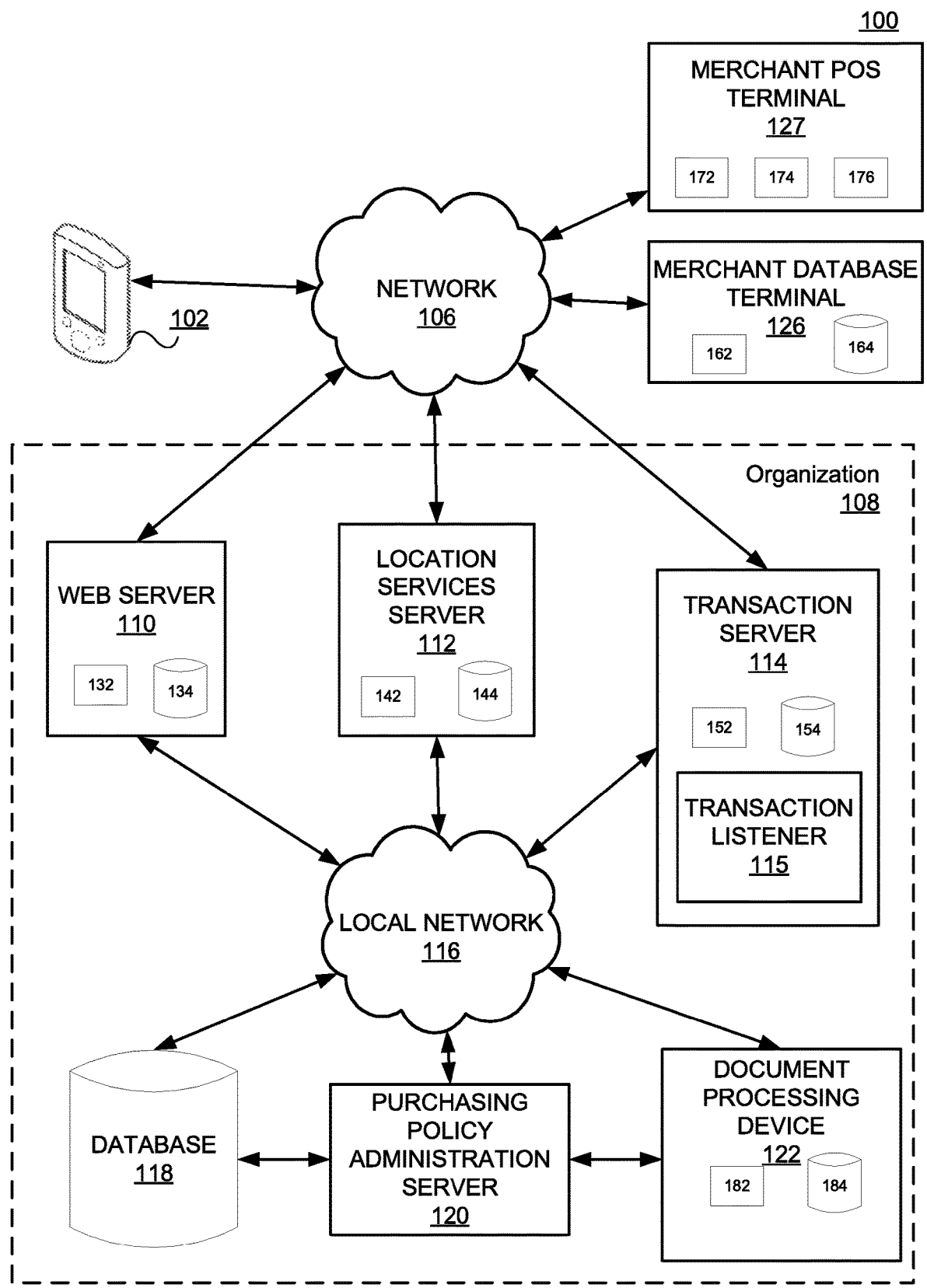
FIG. 1 is a diagram of an example system environment that may be used to implement one or more embodiments of the present disclosure.

FIG. 1 is a diagram of an exemplary system environment 100 that may be configured to perform one or more processes that provide real-time implementation of a purchasing policy. The components and arrangements shown in FIG. 1 are not intended to limit the disclosed embodiments as the components used to implement the disclosed processes and features may vary. As shown, system environment 100 may include a user device 102, a network 106, a merchant database terminal 126, a merchant POS terminal 127, and an organization 108 including, for example, a web server 110, a location services server 112, a transaction server 114, a local network 116, a database 118, a purchasing policy administration server 120, and a document processing device 122. An example architecture that may be used to implement one or more of the user devices 102, merchant database terminal 126, merchant POS terminal 127, web server 110, location services server 112, transaction server 114, database 118, purchasing policy administration server 120, and document processing device 122 is described below with reference to FIG. 2.

User device 102 can include one or more of a mobile device, smart phone, general purpose computer, tablet computer, laptop computer, telephone, PSTN landline, smart wearable device, voice command device, other mobile computing device, or any other device capable of communicating with network 106 and ultimately communicating with one or more components of organization 108. According to some embodiments, user device 102 may communicate with a merchant database terminal 126, and/or merchant POS terminal 127 via network 106. In some embodiments, user device 102 may include or incorporate electronic communication devices for hearing or vision impaired users. In some embodiments, one or more user devices 102 may include software that is configured to allow a user to attest a purchase and/or authenticate a user of the user device 102.

Network 106 may be of any suitable type, including individual connections via the internet such as cellular or Wi-Fi networks. In some embodiments, network 106 may connect terminals, services, and mobile devices using direct connections such as radio-frequency identification (RFID), near-field communication (NFC), Bluetooth™, low-energy Bluetooth™ (BLE), WiFi™, ZigBee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

Network 106 may include any type of computer networking arrangement used to exchange data. For example, network 106 may be the Internet, a private data network, virtual private network using a public network, and/or other suitable connection(s) that enables components in system environment 100 to send and receive information between the components of system 100. Network 106 may also include a public switched telephone network ("PSTN") and/or a wireless network.

Organization 108 may be associated with an entity such as a business, corporation, individual, partnership, or any other entity that provides one or more of goods, services, and consultations to individuals such as customers. For example, in some embodiments, organization 108 may be associated with a financial services provider.

Organization 108 may include one or more servers, devices, and computer systems for performing one or more functions associated with products and/or services that organization 108 provides. Such servers, devices, and computer systems may include, for example, web server 110, location services server 112, transaction server 114, database 118, purchasing policy administration server 120, and document processing device 122 as well as any other computer systems necessary to accomplish tasks associated with organization 108 or the needs of customers (which may be customers of the entity associated with organization 108).

Web server 110 may include a computer system configured to generate and provide one or more websites accessible to customers, as well as any other individuals involved in organization 108's normal operations. Web server 110 may include a computer system configured to receive communications from user device 102 via for example, a mobile application, a chat program, an instant messaging program, a voice-to-text program, an SMS message, email, or any other type or format of written or electronic communication. Web server 110 may have one or more processors 132 and one or more web server databases 134, which may be any suitable repository of website data. Information stored in web server 110 may be accessed (e.g., retrieved, updated, and added to) via local network 116 and/or network 106 by one or more devices of system 100. According to some embodiments, web server 110 may host websites, data or software applications that user device 102 may access and interact with. For example, web server 110 may provide a website, web portal or software application that allows a user of user device 102 to access or view account information associated with one or more financial accounts of the user. In some embodiments, web server 110 may receive and forward communications or portions of communications between user device 102 and components of system 100, such as location services server 112, transaction server 114, database 118, purchasing policy administration server 120, and/or document processing device 122. According to some embodiments, web server 110 may be configured to transmit data and/or messages from a first user device 102.

Location services server 112 may include a computer system configured to track the location of user device 102 based on information and data received from user device 102. For example, location services server 112 may receive location data from user device 102, such as global positioning satellite (GPS) data including the coordinates of the device, RFID data of associated with known objects and/or locations, or network data such as the identification, location, and/or signal strength of a wireless base station (e.g., Wi-Fi router, cell tower, etc.) connected to user device 102 that may be used to determine the location of user device 102. According to some embodiments, location services server 112 may store geofencing information that represents a designed location or area. As those of skill in the art will appreciate, a geofence may be a virtual geographic boundary that when crossed by user device 102, may trigger system 100 to execute one or more actions. According to some embodiments, the contours of a geofence may be predetermined, for example, location services server 112 may receive one or more predetermined geofences that are associated with respective locations from a third party. For example, location services server 112 may receive data representative of a geofence around a particular store from an organization associated with the store that determined the location of the geofence. In some embodiments, the contours of a geofence may be determined by receiving (e.g., from a user of system 100) the location of a point (e.g., longitude and latitude) and a radius and setting the contours of the geofence to be equal to the location of a circle draw around the point at the specified radius. In some embodiments, a geofence may be specified by a user of system 100 by, for example, drawing the geofencing onto a virtual map or otherwise inputting the location of the geofence.

Location services server 112 may have one or more processors 142 and one or more location services databases 144, which may be any suitable repository of location data. Information stored in location services server 112 may be accessed (e.g., retrieved, updated, and added to) via local network 116 and/or network 106 by one or more devices of system 100. In some embodiments, location services processor 142 may be used to determine the location of user device 102, whether user device 102 has crossed a particular geofence or whether user device 102 is inside or outside of an area designated by a particular geofence. In some embodiments, location services server 112 may be configured to send messages and/or data to other devices, such as for example, user device 102 or purchase policy administration server 120, upon determining that user device 102 has crossed a specified geofence or entered an area encompassed by a specified geofence. For example, in some embodiments, location services server 112 may determine that user device 102 is within a geographic region of a pending purchase to authenticate a user of the user device 102.

Transaction server 114 may include a computer system configured to process one or more transactions involving a financial account associated with a customer. For example, a transaction may be a purchase of goods or services from a merchant that is made in association with a financial account, such as a bank account or a credit card account. Transactions may be made at merchant POS terminal 127 by for example, swiping a credit card or making a payment using financial account information stored on a smartphone in a digital wallet. Such transactions may be made at merchant locations or at a merchant website via the internet. Transactions may be made using for example, a credit card, a debit card, a gift card, or other ways of conveying financial account numbers and/or account credentials that are known in the art. Transaction server 114 may have one or more processors 152 and one or more transaction server databases 154, which may be any suitable repository of transaction data. Information stored in transaction server 114 may be accessed (e.g., retrieved, updated, and added to) via local network 116 and/or network 106 by one or more devices of system 100. As described in more detail below, transaction server 114 may store specified account numbers or PANs that may be the subject of transaction monitoring, as well as associated rules, limitations or restrictions that may be applied to an attempted transaction associated with the specified account number/PAN to determine whether to authorize the attempted transaction.

As will be appreciated of those of skill in the art, a credit card may conventionally include a primary account number (PAN) that is a numerical code that is typically between 14 and 16 digits long. In some embodiments, the first six digits of the PAN represent a credit card network, the next set of digits represent a user account number and one or more final digits may represent an additional fraud security digit. According to some embodiments, upon swiping a credit card at merchant POS terminal/device or entering the PAN into a website to make an online purchase, transaction server 114 may receive transaction authorization data representative of the attempted transaction. Such transaction authorization data may include the PAN associated with the card used to make the attempted purchase, and may include other information related to the transaction or merchant, such as the amount of the attempted transaction, the date and time of the attempted transaction, and a merchant category code (which may be referred to herein as a "merchant code") associated with the merchant at which the transaction was attempted. According to some embodiments, transaction server 114 may receive transaction authorization requests including transaction authorization data and may decide as to whether or not the transaction should be authorized. According to some embodiments, if transaction server 114 determines that the attempted transaction is subject to a purchasing policy (e.g., if transaction listener 115 determines that a transaction card is subject to a purchasing policy), transaction server 114 may forward the purchase information to purchasing policy administration server 120. If the transaction is authorized (e.g., by purchasing policy administration server 120), transaction server 114 may generate an authorization message and transmit the authorization message to the merchant (e.g., to a merchant POS terminal or merchant database terminal) to authorize the transaction.

In some embodiments, in response to authorizing a transaction, transaction server 114 may store a record of the transaction and update account information such as the balance of the account. Although the preceding description was made with respect to a credit card, it should be understood that other embodiments relating to other types of payment methods such as debit cards, gift cards, and any other such type of financial account, including online financial accounts, are contemplated as well.

According to some embodiments, transaction server 114 may determine the identity of a merchant associated with an attempted transaction based on the merchant category code included in the transaction authorization data and/or other transaction authorization data such as the zip code and country code. For example, in some embodiments, transaction server 114 may be configured to determine the identity of the business, such as a particular chain of fast food restaurants, based on the merchant category code. According to some embodiments, transaction server 114 may determine information about the merchant associated with a transaction such as the merchant's name, type/category of merchant, location, address and the like, by utilizing third party data and/or machine learning techniques to derive such information. According to some embodiments, transaction server 114 may be configured to determine one or more of a merchant description, a merchant name, a merchant location/address/zip code/country code based on a transaction ID associated with the transaction. In some embodiments, transaction server 114 may be configured to determine the location or address of the attempted purchase based on the merchant category code or other data provided with a transaction authorization request. According to some embodiments, if the identity of the merchant may not be determined solely based on the merchant category code, it may be determined based on the merchant category code in conjunction with the location information derived from the transaction authorization request. In some embodiments, transaction server 114 may be configured to determine the type of business at which the attempted transaction is made based on the merchant category code, such as whether the merchant is a restaurant, gas station, book store, movie theater or the like. In some embodiments, transaction server 114 may cleanse the raw transaction data and output transaction data that human readable. For example, transaction server 114 may receive transaction authorization data associated with a transaction that has a transaction ID of NCPI567 and may cleanse the transaction to output that the transaction took place at a restaurant called "Burger Joint" that is located at 123 Main Street.

According to some embodiments, transaction server 114 may include a transaction listener 115 that may be configured to monitor transaction authorization data that originates from, for example, one or more merchant POS terminals or devices. According to some embodiments, transaction listener 115 may monitor incoming transaction authorization requests to identify attempted transactions that are associated with a stored PAN. For example, for each attempted transaction, transaction listener 115 may compare the PAN associated with the attempted transaction with a specified PAN to identify all attempted transactions associated with the specified PAN. For example, transaction listener 115 may identify one or more attempted transactions associated with a particular credit card account by monitoring transaction authorization request data to identify attempted transactions that were made in association with payment method associated with a PAN that matches the PAN of the specified credit card. According to some embodiments, transaction listener 115 may receive transaction authorization requests in real time if, for example, a financial account associated with the attempted payment method is part of a network associated with organization 108. In some embodiments, transaction listener 115 may receive a batch of transaction authorization requests at a particular time, such as at the end of the day, if, for example, the financial account associated with the attempted payment method is not part of a network associated with organization 108. Accordingly, in some embodiments, transaction listener 115 may monitor transaction authorization data in real time (or, in very close temporal proximity to when each attempted transaction is made), and in some embodiments transaction listener 115 may monitor transaction authorization data in batches at specified intervals, or some combination of both. In this way, transaction server 114 may be configured to monitor, identify and authorize or reject attempted transactions associated with a specified financial account in real time and/or intermittently at intervals.

According to some embodiments, transaction server 114 may be configured to send and/or initiate payments from a financial account in response to authorizing an attempted transaction associated with the account. For example, if transaction server 114 authorizes a particular transaction made using a specified financial account at a merchant, then transaction server 114 may generate an instruction to debit the specified financial account with the amount of the transaction and credit an account associated with the merchant with the same amount. In some embodiments, if transaction server 114 authorizes an attempted transaction associated with a tokenized PAN, then transaction server may initiate a payment from an account associated with the tokenized PAN to a merchant at which the payment was made.

Local network 116 may include any type of computer networking arrangement used to exchange data in a localized area, such as WiFi, Bluetooth™ Ethernet, and other suitable network connections that enable components of organization 108 to interact with one another and to connect to network 106 for interacting with components in system environment 100. In some embodiments, local network 116 may include an interface for communicating with or linking to network 106. In other embodiments, components of organization 108 may communicate via network 106, without a separate local network 116.

According to some embodiments, database 118 may be a database associated with organization 108 and/or its related entity that may store a variety of information relating to customers, transactions, customer information, and business operations. Database 118 may also serve as a back-up storage device and may contain data and information that is also stored on, for example, local databases associated with web server 110, location services server 112, transaction server 114, purchasing policy administration server 120, and/or document processing device 122. Database 118 may be accessed by other devices and may be used to store records of every interaction, communication, and/or transaction a particular customer has had with organization 108 and/or its related entity. According to some embodiments, database 118 may store data associated with current or past transaction conducted by users of system 100, such as for example, data identifying a purchaser, purchased goods, and past violations of or comportation with purchasing policies.

Purchasing policy administration server 120 may include a computer system configured to facilitate the administration of one or more purchase policies for a user (e.g., of user device 102). According to some embodiments, purchasing policy administration server 120 may analyze requested purchases to determine whether they comport with a purchase policy.

For example, purchasing policy administration server 120 may receive purchase data (e.g., requested payment information) from transaction server 114. Purchasing policy administration server 120 may retrieve a user profile corresponding to the purchaser (e.g., from database 118), and compare the purchasing policy to the purchase data and user profile to determine whether the transaction is suspicious (e.g., potentially outside of a spending policy or otherwise unauthorized). For example, transactions may be identified as suspicious if there are inconsistencies with the user's profile (e.g., travelling expenses for an employee category that does not travel), inconsistencies with other purchases made at a location/event (e.g., food purchase at an office supplies store), and/or distance of transaction from authorized business location/event (e.g., potentially indicating an unauthorized online order). If the transaction is suspicious (e.g., potentially unauthorized), purchasing policy administration server 120 may generate an attestation request including a request for evidence that the attempted purchase comports with the purchasing policy. Purchasing policy administration server 120 may transmit the attestation request to user device 102, e.g., through web server 110. Purchasing policy administration server 120 may analyze attestation data (e.g., as a response from user device 102) to determine whether the attempted purchase should be authorized.

Document processing device 122 may have one or more processors 182 and one or more databases 184. Document processing device 122 may process the attestation data received from user device 102. As a non-limiting example, the attestation data may include a prebill, a bill of goods or service, invoice, or the like (any referred to herein as "invoice"). In some cases, document processing device 122 may also process authentication documents authenticating the identity of the user. For example, authentication documents may include employee identification, drivers' licenses, and the like. Document processing device 122 may perform image processing on the attestation data and authentication data. In some cases, document processing device 122 may perform optical character recognition on the attestation data and authentication data. Document processing device 122 may provide the processed information to purchasing policy administration server 120 to determine whether a purchase comports to the applied purchasing policy.

Merchant database terminal 126 may have one or more processors 162 and one or more merchant databases 164, which may be any suitable repository of merchant data. Merchant database terminal 126 may be located at the POS location, off-site at another merchant location, or at a third-party location. Information stored in merchant database terminal 126 may be accessed (e.g., retrieved, updated, and added to) via network 106 by one or more devices (e.g., service provider terminal 110) of system 100. In other embodiments, merchant POS terminal 127 may be configured to process online transactions on behalf of the associated merchant. Merchant database 164 may store information relating to products and services offered by merchants such as pricing, quantity, availability, discounts, reviews, and any other such generally available information that a consumer may utilize in making a purchasing decision. In some embodiments, merchant database 164 may also include location information associated with products and services that identifies the location(s) that a particular product or service is available for purchase. In some embodiments, the location information may include an identification of a particular store, terminal, or kiosk that the product or service may be purchased from.

Merchant POS terminal 127 may have one or more POS devices 172, 174, 176 that communicate with one or more devices (e.g., user device 102) of system 100 via network 106. In some embodiments, POS devices 172, 174, 176 may devices that are configured to receive or obtain payment information from user device 102. For example, one or more POS devices 172 174, 176 may include a near-field communication interface, a Bluetooth communication interface, a WiFi communication interface, or any other such communication interface that may enable communication between merchant POS terminal 127 and user device 102. In some embodiments, one or more POS devices 172, 174, 176 may include a scanner for scanning images or data that convey payment information displayed by user device 102, an image capture device for capturing images displayed by user device 102, a card-reading device for obtaining payment information from a card (e.g., by reading a chip imbedded in the card or reading information from a magnetic strip), or a keypad for receiving a user input representative of payment information (e.g., a typed credit card number). Although aspects of the present disclosure are discussed a merchant terminal 127 and one or more POS devices 172, 174, 176, one of ordinary skill will recognize that these are merely examples. Certain implementations may utilize any transaction terminal (either virtual or physical), including one executed on a user device or via a webpage.

Although the preceding description describes various functions of the user device 102, merchant database terminal 126, merchant POS terminal 127, web server 110, location services server 112, transaction server 114, database 118, purchasing policy administration server 120, and document processing device 122, in some embodiments, some or all of these functions may be carried out by one or more computing devices. For example, some or all of the functions of the user device 102, merchant database terminal 126, merchant POS terminal 127, web server 110, location services server 112, transaction server 114, database 118, purchasing policy administration server 120, and document processing device 122 may be carried out by a single device.

Figure 2:
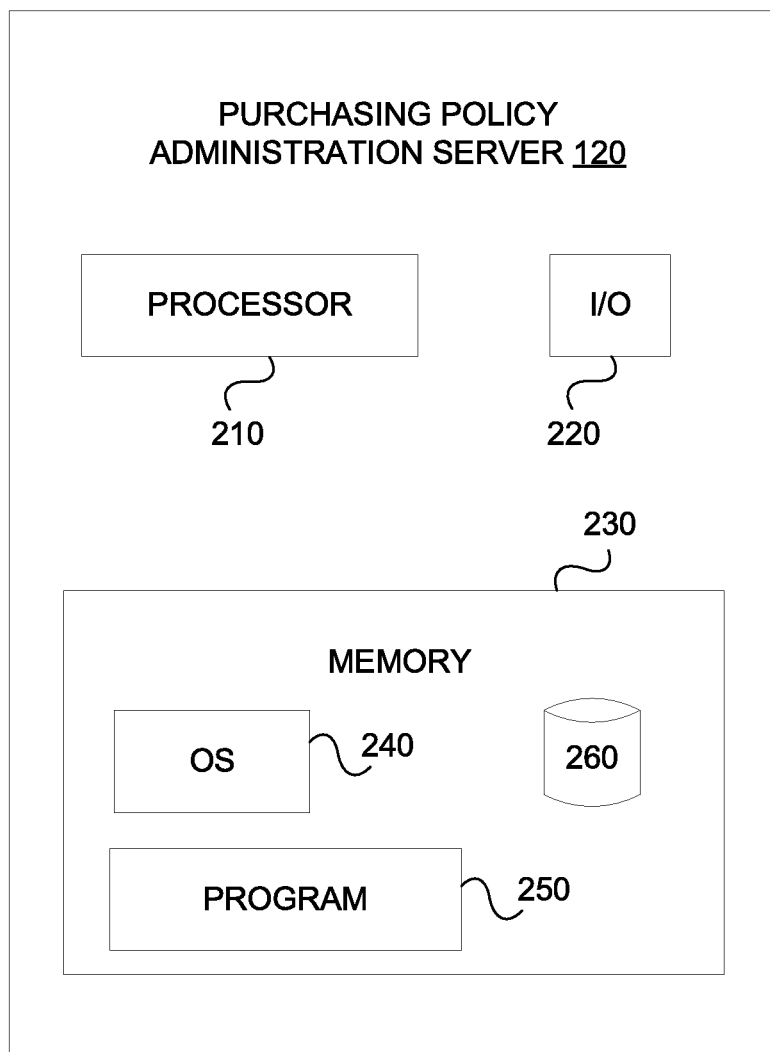
FIG. 2 is a component diagram of a purchasing policy administration server according to an example embodiment.

An example embodiment of purchasing policy administration server 120 is shown in more detail in FIG. 2. User device 102, web server 110, location services server 112, transaction server 114, document processing device 122, merchant database terminal 126, and merchant POS terminal 127 may have a similar structure and components that are similar to those described with respect to purchasing policy administration server 120. As shown, purchasing policy administration server 120 may include a processor 210, an input/output ("I/O") device 220, a memory 230 containing an operating system ("OS") 240, a program 250, and a database. For example, purchasing policy administration server 120 may be a single server or may be configured as a distributed computer system including multiple servers or computers that interoperate to perform one or more of the processes and functionalities associated with the disclosed embodiments. In some embodiments, purchasing policy administration server 120 may further include a peripheral interface, a transceiver, a mobile network interface in communication with processor 210, a bus configured to facilitate communication between the various components of the purchasing policy administration server 120, and a power source configured to power one or more components of purchasing policy administration server 120.

A peripheral interface may include the hardware, firmware and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general-purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), Wi-Fi™, Zig- Bee™ ambient backscatter communications (ABC) protocols or similar technologies.

A mobile network interface may provide access to a cellular network, the Internet, or another wide-area network. In some embodiments, a mobile network interface may include hardware, firmware, and/or software that allows processor(s) 210 to communicate with other devices via wired or wireless networks, whether local or wide area, private or public, as known in the art. A power source may be configured to provide an appropriate alternating current (AC) or direct current (DC) to power components.

Processor 210 may include one or more of a microprocessor, microcontroller, digital signal processor, co-processor or the like or combinations thereof capable of executing stored instructions and operating upon stored data. Memory 230 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein are implemented as a combination of executable instructions and data within the memory 230.

Processor 210 may be one or more known processing devices, such as a microprocessor from the Pentium™ family manufactured by Intel™ or the Turion™ family manufactured by AMD™. Processor 210 may constitute a single core or multiple core processor that executes parallel processes simultaneously. For example, processor 210 may be a single core processor that is configured with virtual processing technologies. In certain embodiments, processor 210 may use logical processors to simultaneously execute and control multiple processes. Processor 210 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

Purchasing policy administration server 120 may include one or more storage devices configured to store information used by processor 210 (or other components) to perform certain functions related to the disclosed embodiments. In one example, purchasing policy administration server 120 may include memory 230 that includes instructions to enable processor 210 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, purchasing policy administration server 120 may include memory 230 that includes instructions that, when executed by processor 210, perform one or more processes consistent with the functionalities disclosed herein. Methods, systems, and articles of manufacture consistent with disclosed embodiments are not limited to separate programs or computers configured to perform dedicated tasks. For example, purchasing policy administration server 120 may include memory 230 that may include one or more programs 250 to perform one or more functions of the disclosed embodiments. Moreover, processor 210 may execute one or more programs 250 located remotely from purchasing policy administration server 120. For example, purchasing policy administration server 120 may access one or more remote programs 250, that, when executed, perform functions related to disclosed embodiments.

Memory 230 may include one or more memory devices that store data and instructions used to perform one or more features of the disclosed embodiments. Memory 230 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational databases. Memory 230 may include software components that, when executed by processor 210, perform one or more processes consistent with the disclosed embodiments. In some embodiments, memory 230 may include an image processing database 260 and a neural-network pipeline database 270 for storing related data to enable purchasing policy administration server 120 to perform one or more of the processes and functionalities associated with the disclosed embodiments.

Purchasing policy administration server 120 may also be communicatively connected to one or more memory devices (e.g., databases (not shown)) locally or through a network. The remote memory devices may be configured to store information and may be accessed and/or managed by purchasing policy administration server 120. By way of example, the remote memory devices may be document management systems, Microsoft™ SQL database, Share-Point™ databases, Oracle™ databases, Sybase™ databases, or other relational databases. Systems and methods consistent with disclosed embodiments, however, are not limited to separate databases or even to the use of a database.

Purchasing policy administration server 120 may also include one or more I/O devices 220 that may include one or more interfaces for receiving signals or input from devices and providing signals or output to one or more devices that allow data to be received and/or transmitted by purchasing policy administration server 120. For example, purchasing policy administration server 120 may include interface components, which may provide interfaces to one or more input devices, such as one or more keyboards, mouse devices, touch screens, track pads, trackballs, scroll wheels, digital cameras, microphones, sensors, and the like, that enable purchasing policy administration server 120 to receive data from one or more users (such as via user device 120).

In example embodiments of the disclosed technology, purchasing policy administration server 120 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While purchasing policy administration server 120 has been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of the purchasing policy administration server 120 may include a greater or lesser number of components than those illustrated.

Figure 3:
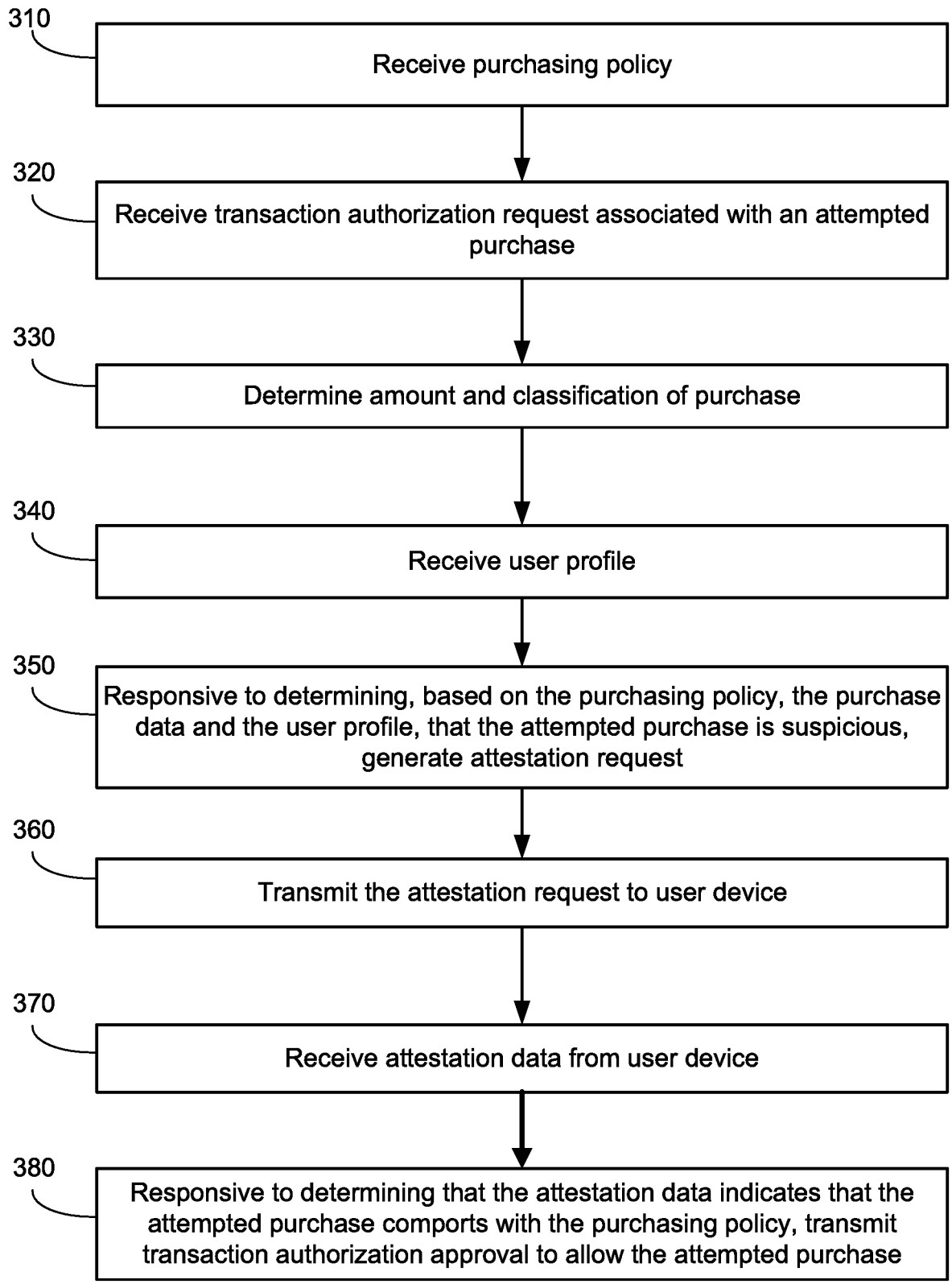
FIGS. 3-5 are flowcharts of one or more methods according to certain example embodiments.

FIG. 3 shows a flowchart of a method 300 according to an example embodiment. Method 300 may be performed by, for example, one or more elements of system environment 100. Referring to FIG. 3, method 300 may include receiving 310 a purchasing policy. The purchasing policy may define purchases that are authorized for a particular account, user, or group of users (e.g., employees of a company using the company's credit cards). The purchasing policy may be received from an organization (e.g., input through a web interface). The purchasing policy may be specific to a particular account (e.g., PAN), a particular user (e.g., account holder), and/or organization. In some cases, the purchasing policy may be globally applied (e.g., across an organization or between organizations), such as one based on state and federal tax rules. In some cases, the purchasing policy may be a customized based on a default purchasing policy. In some circumstances, the purchasing policy may be unique to an organization, user/authorized purchaser, or the like. As non-limiting examples, purchasing policies may limit purchases for tobacco, alcohol, and/or personal care.

Method 300 may further include receiving 320 a transaction authorization request associated with an attempted purchase made using a transaction card. In some cases, the transaction server 114 may receive the transaction authorization request from a merchant POS terminal 127. In some cases, the transaction server 114 may also receive (e.g., from merchant POS terminal 127) additional purchase data associated with the attempted purchase. The additional purchase data may include a list of one or more items or services and respective costs of each of the one or more items or services. In some cases, the additional purchase data may indicate a location of a user device of a user associated with the used transaction card; for example, if the two are separated, it may indicate that the transaction card has been stolen. In certain implementations, the additional purchase data may be received via a software application executed on user device 102 (e.g., in response to the software application being used in association with the attempted purchase).

In some cases, a transaction may be declined a first time, and a purchaser (i.e., an authorized purchaser) and/or manager may be notified of the attempted purchase. The purchaser and/or manager may indicate whether the charge should be allowed on a second attempt. In some implementations, a purchaser may preemptively request approval (e.g., from a purchasing manager), such as through a request in an application associated with the purchasing policy management system. The manager may then provide real-time approval for the purchase Method 300 may further include determining 330, based on the transaction authorization data, purchase data including an amount of the attempted purchase and a classification of the attempted purchase. Method 300 may also include receiving 340 a user profile corresponding to a user. The user profile may be associated with the transaction card and include data representative of past purchasing behavior of the user. The user profile the user profile may include an indication of previous suspicious activity in association with a first classification of purchase. The user profile may, for example, indicate past behavior that could be fraudulent (such as continued purchases just below a reporting limit), and increase scrutiny of purchases form these users. The user profile may be retrieved by purchasing policy administration server 120 from database 118.

Responsive to determining, based the purchasing policy, the purchase data and the user profile, that the attempted purchase is suspicious, the method 300 may include generating 350 an attestation request. The attestation request may include a request for evidence sufficient to show that the attempted purchase comports with the purchasing policy. Determining that the attempted purchase is suspicious may include determining that the classification of the attempted purchase matches the first classification in the user data and/or determining that the amount of the attempted purchase falls within a predetermined range of amounts. In some embodiments, determining that the attempted purchase is suspicious may include: receiving (e.g., from user device 102) location data indicative of the location of the user, determining, based on the transaction authorization request, a location of a merchant associated with the attempted purchase, and determining, that the location of the user is more than a threshold distance away from the location of the merchant associated with the attempted purchase. In some cases, determining that the attempted purchase is suspicious may include determining that at least one item or service of the one or more items or services listed in the purchase data is prohibited by the purchasing policy.

After generating 350 the request, the method 300 may include transmitting 360 the attestation request to a device associated with the user (e.g., user device 102), and receiving 370 attestation data from the user device. In some cases, the attestation request may include a request for an image of an invoice associated with the attempted purchase. The attestation data may include a digital image of the invoice obtained from the device associated with the user. The attestation data may include an email from a merchant associated with the attempted purchase.

Based on the attestation data, the method 300 may include determining whether the purchase comports with the purchasing policy. For example, responsive to determining that the attestation data indicates that the attempted purchase comports with the purchasing policy, transaction server 114 may transmit 380 transaction authorization approval to allow the attempted purchase, e.g., to merchant POS terminal 127. Determining that the attestation data shows that the attempted purchase comports with the purchasing policy may include identifying (e.g., using OCR on the digital image of the invoice) one or more purchased items, and determining that the one or more purchased items are not restricted by the purchasing policy.

In some cases, the attestation data may fail to indicate that the attempted purchase comports with the purchasing policy. In response, transaction server 114 may transmit (e.g., to the merchant POS device 127) a transaction authorization rejection to deny the attempted purchase. In some cases, responsive to determining that the attestation data fails to indicate that the attempted purchase comports with the purchasing policy, the method 300 may include transmitting, to user device 102, an alternative payment request message representing a request to process the payment using a personal account of the user. User device 102 may provide the alternative payment authorization (e.g., by transmitting a personal payment acceptance message), and transaction server 114 may transmit an alternative transaction authorization approval to the merchant POS terminal 127 to allow the attempted purchase using the personal account of the user. In response to a personal payment rejection message from the user device 102, the system may transmit, to the merchant POS terminal 127, a transaction authorization rejection to deny the attempted purchase. As a non-limiting example, if an attempted purchase is attempted with a virtual card (e.g., in a virtual wallet), the virtual card may be configured to route to a business account if a purchase meets the purchasing policy, and route to a personal account if the purchase fails the purchasing policy (even temporarily).

Figure 4:
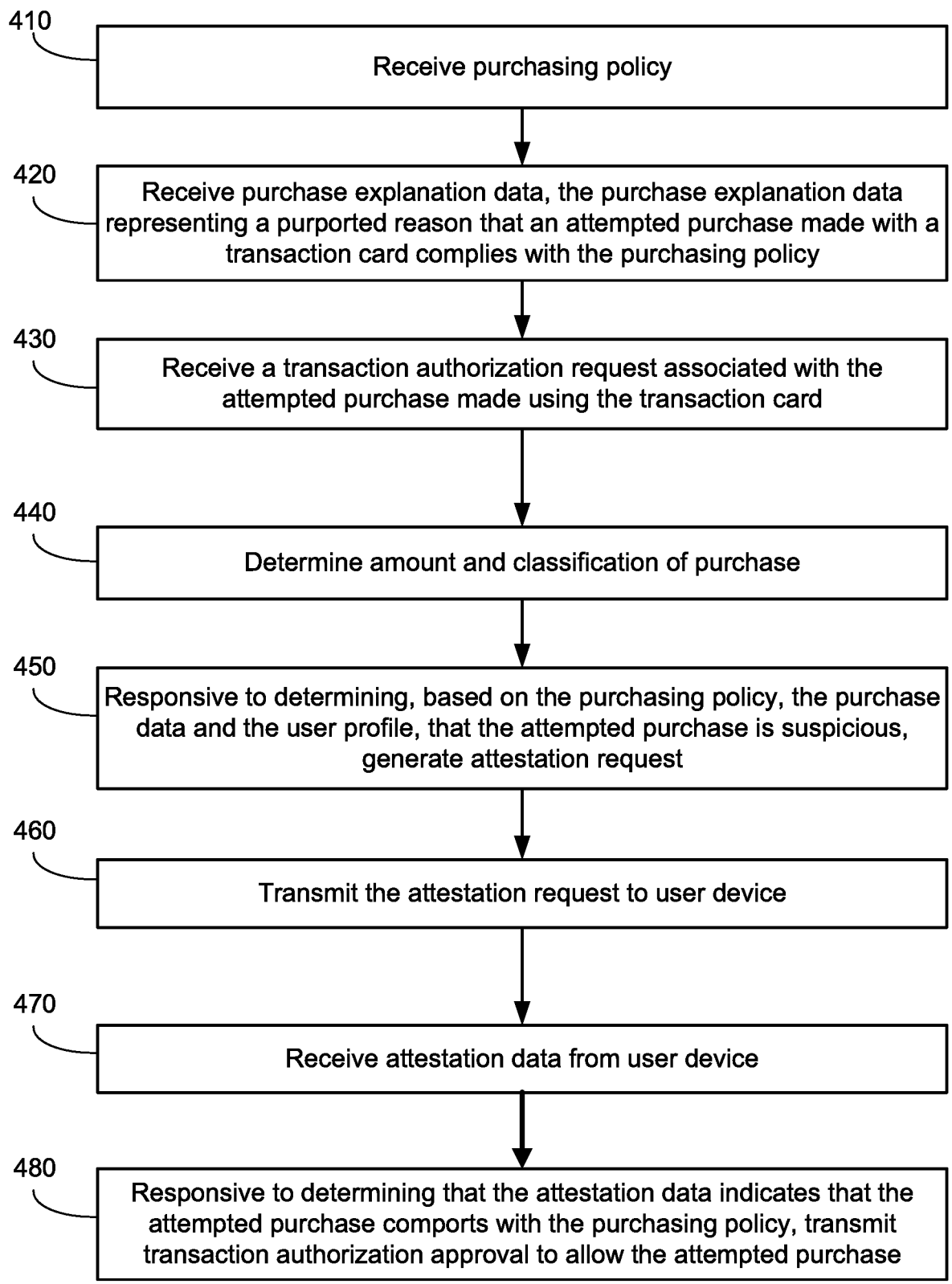

FIG. 4 shows a flowchart of a method 400 according to an example embodiment. Method 400 may be performed by, for example, one or more elements of system environment 100. Referring to FIG. 4, method 400 may include receiving 310 a purchasing policy. The purchasing policy may be received from an organization (e.g., input through a web interface). The purchasing policy may be specific to a particular account (e.g., PAN), a particular user (e.g., account holder), and/or organization. Method 400 may include receiving 420, via a software application of a user device associated with a user, purchase explanation data. The purchase explanation data may represent a purported reason that an attempted purchase made with a transaction card complies with the purchasing policy. The purchase explanation data may include at least one from among an indication of an event, a list of participants, and an itemized list of expenses. The purchase explanation data may be gathered from one or more user devices, for example, automatically (based on a user's calendar, GPS data, email data, area devices) or manually (e.g., entered by a purchaser). In some cases, this the purchase explanation data may be gathered prior to a purchasing policy decision. For example, the purchase explanation data may be provided with an authorization request. A purchasing policy system in accordance with an embodiment of the present disclosure and/or a purchase policy manager may review the purchase explanation data in conjunction with the request to determine whether the purchase meets the purchasing policy.

Method 400 may further include receiving 430 a transaction authorization request associated with an attempted purchase made using a transaction card. In some cases, the transaction server 114 may receive the transaction authorization request from a merchant POS terminal 127

Method 400 may also include determining 440, based on the transaction authorization data, purchase data including an amount of the attempted purchase and a classification of the attempted purchase.

Responsive to determining, based the purchasing policy, the purchase data and the user profile, that the attempted purchase is suspicious, the method 400 may include generating 450 an attestation request. The attestation request may include a request for evidence sufficient to show that the attempted purchase comports with the purchasing policy. Determining that the attempted purchase is suspicious may include determining an event location associated with the event. receiving location data from a plurality of mobile devices and determining that one or more of the plurality of mobile devices was not present within a predetermined proximity of the event location within a time window associated with the event. Each of the plurality of the mobile devices is associated with an individual corresponding to the list of participants. In some cases, the event location and the time window may be determined from a calendar program associated with user device 102. In some cases, method 400 may further include determining a list of attendees to an event based on electronic reservation or RSVP responses to an electronic invite to the event. The electronic RSVPS may correspond to participants. The list of attendees may be compared to the list of participants.

After generating 450 the request, the method 400 may include transmitting 460 the attestation request to a device associated with the user (e.g., user device 102), and receiving 470 attestation data from the user device. In some cases, the attestation request may include a request for an image of an invoice associated with the attempted purchase. The attestation data may include a digital image of an invoice obtained from the device associated with the user. The attestation data may include an email from a merchant associated with the attempted purchase (e.g., an email from the merchant attesting to the purchase).

Based on the attestation data, the method 400 may include determining whether the purchase comports with the purchasing policy. For example, responsive to determining that the attestation data indicates that the attempted purchase comports with the purchasing policy, transaction server 114 may transmit 480 transaction authorization approval to allow the attempted purchase, e.g., to merchant POS terminal 127. Determining that the attestation data shows that the attempted purchase comports with the purchasing policy may include identifying (e.g., using OCR on the digital image of the invoice) one or more purchased items, and determining that the one or more purchased items are not restricted by the purchasing policy.

In some cases, method 400 may include receiving additional purchase data associated with the attempted purchase, the additional purchase data identifying at least selected one item and an associated cost. Responsive to determining, based a comparison of the purchasing policy, the purchase data, additional purchase data and/or the purchase explanation data, that the cost of the at least one selected item is above a predetermined threshold associated with the classification of the attempted purchase, organization 108 may transmit (e.g., to user device 102), an alternative purchase recommendation representing an alternative item that may be purchased for less than the cost of the selected item.

Figure 5:
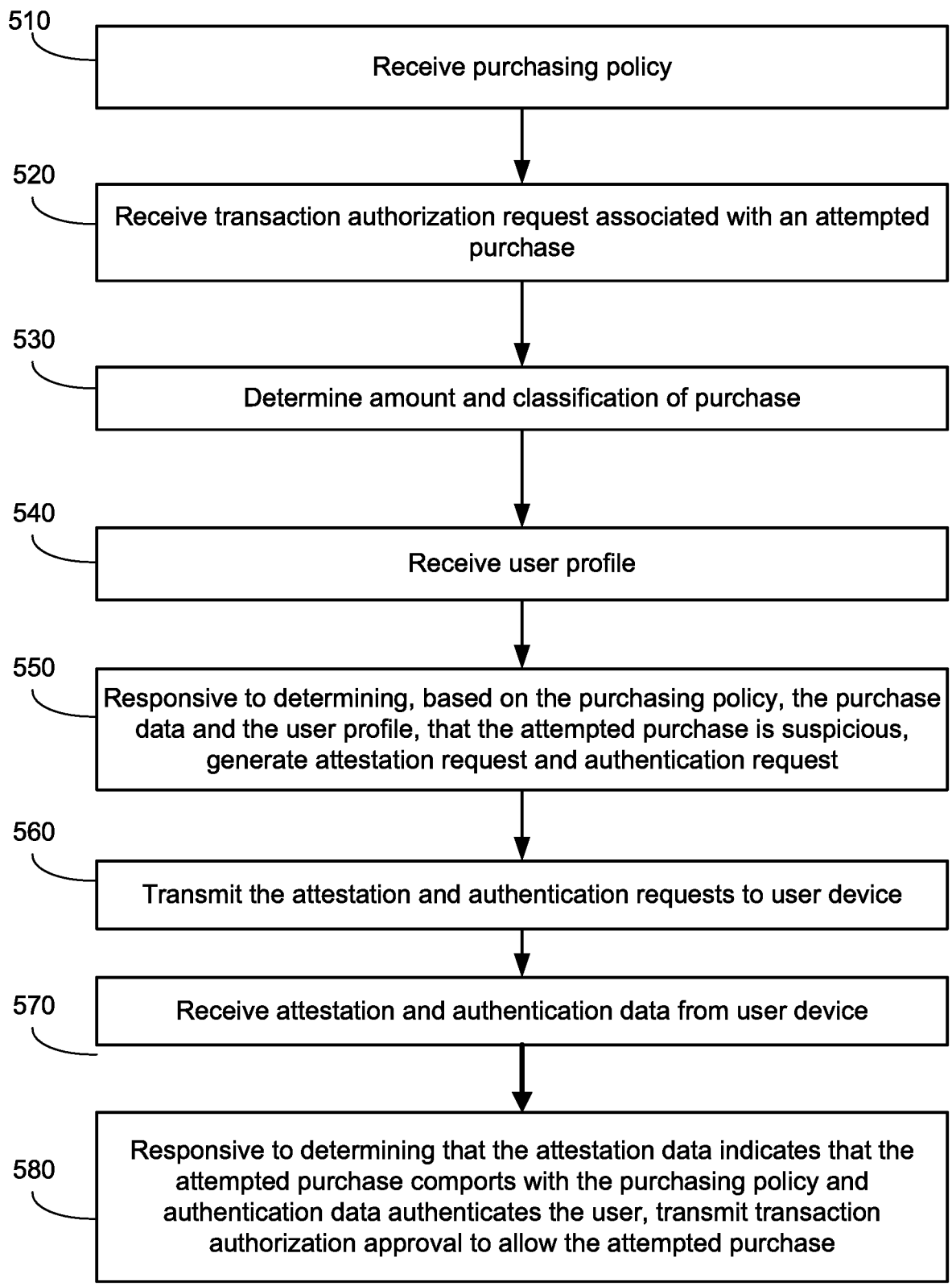

FIG. 5 shows a flowchart of a method 500 according to an example embodiment. Method 500 may be performed by, for example, one or more elements of system environment 100. Referring to FIG. 5, method 500 may include receiving 510 a purchasing policy. The purchasing policy may be received from an organization (e.g., input through a web interface). The purchasing policy may be specific to a particular account (e.g., PAN), a particular user (e.g., account holder), and/or organization.

Method 500 may further include receiving 520 a transaction authorization request associated with an attempted purchase made using a transaction card. In some cases, the transaction server 114 may receive the transaction authorization request from a merchant POS terminal 127. In some cases, the transaction server 114 may also receive (e.g., from merchant POS terminal 127) additional purchase data associated with the attempted purchase. The additional purchase may include a list of one or more items or services and respective costs of each of the one or more items or services. In certain implementations, the additional purchase data may be received via a software application executed on user device 102 (e.g., in response to the software application being used in association with the attempted purchase).

Method 500 may further include determining 530, based on the transaction authorization data, purchase data including an amount of the attempted purchase and a classification of the attempted purchase. Method 500 may also include receiving 540 a user profile corresponding to a user. The user profile may be associated with the transaction card and include data representative of past purchasing behavior of the user. The user profile the user profile may include an indication of previous suspicious activity in association with a first classification of purchase. The user profile may be retrieved by purchasing policy administration server 120 from database 118.

Responsive to determining, based the purchasing policy, the purchase data and the user profile, that the attempted purchase is suspicious, the method 500 may include generating 550 an attestation request and an authentication request. The attestation request may include a request for evidence sufficient to show that the attempted purchase comports with the purchasing policy. Determining that the attempted purchase is suspicious may include determining that the classification of the attempted purchase matches the first classification in the user data and/or determining that the amount of the attempted purchase falls within a predetermined range of amounts. In some embodiments, determining that the attempted purchase is suspicious may include: receiving (e.g., from user device 102) location data indicative of the location of the user, determining, based on the transaction authorization request, a location of a merchant associated with the attempted purchase, and determining, that the location of the user is more than a threshold distance away from the location of the merchant associated with the attempted purchase. In some cases, determining that the attempted purchase is suspicious may include determining that at least one item or service of the one or more items or services listed in the purchase data is prohibited by the purchasing policy.

After generating 550 the attestation and authentication requests, the method 500 may include transmitting 560 the attestation and authentication requests to a device associated with the user (e.g., user device 102), and receiving 570 attestation data and authentication data from the user device. In some cases, the attestation request may include a request for an image of an invoice associated with the attempted purchase. The attestation data may include a digital image of an invoice obtained from the device associated with the user. The attestation data may include an email from a merchant associated with the attempted purchase. In some cases, the authentication data may include biometric data, passwords, multi-factor authentication, and second-party approval (e.g., a co-purchaser and/or a purchasing policy manager) of the user obtained by user device 102.

Based on the attestation data and the authentication data, the method 500 may include determining whether the purchase comports with the purchasing policy. For example, responsive to determining that the attestation data indicates that the attempted purchase comports with the purchasing policy and that the authentication data authenticates the user, transaction server 114 may transmit 580 transaction authorization approval to allow the attempted purchase, e.g., to merchant POS terminal 127. Determining that the attestation data shows that the attempted purchase comports with the purchasing policy may include identifying (e.g., using OCR on the digital image of the invoice) one or more purchased items, and determining that the one or more purchased items are not restricted by the purchasing policy. Determining that the authentication data authenticates the user may include comparing the biometric data of the user obtained by the device to stored biometric data associated with the user.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

An embodiment of the present disclosure may be implemented according to at least the following:

Clause 1: A method of administering an organizational purchasing policy, the method including: receiving a purchasing policy; receiving, from a transaction terminal, a transaction authorization request, the transaction authorization request including transaction authorization data associated with an attempted purchase made using a transaction card; determining, based on the transaction authorization data, purchase data including: an amount of the attempted purchase; and a classification of the attempted purchase; receiving a user profile corresponding to a user, the user profile being associated with the transaction card and including data representative of past purchasing behavior of the user; responsive to determining, based a comparison of the purchasing policy, the purchase data and the user profile, that the attempted purchase is suspicious, generating an attestation request including a request for evidence sufficient to show that the attempted purchase comports with the purchasing policy; transmitting, to a user device associated with the user, the attestation request; receiving, from the user device, attestation data; and responsive to determining that the attestation data indicates that the attempted purchase comports with the purchasing policy, transmitting, to the transaction terminal, a transaction authorization approval to allow the attempted purchase.

Clause 2: The method of clause 1 further including, responsive to determining that the attestation data fails to indicate that the attempted purchase comports with the purchasing policy, transmitting, to the transaction terminal, a transaction authorization rejection to deny the attempted purchase.

Clause 3: The method of claim 2 further including: responsive to determining that the attestation data fails to indicate that the attempted purchase comports with the purchasing policy, transmitting, to the user device, an alternative payment request message representing a request to process the attempted purchase using a personal account of the user; responsive to receiving, from the user device, a personal payment acceptance message, transmitting, to the transaction terminal, an alternative transaction authorization approval to allow the attempted purchase using the personal account of the user; and responsive to receiving, from the user device, a personal payment rejection message, transmitting, to the transaction terminal, a transaction authorization rejection to deny the attempted purchase.

Clause 4: The method of any of clauses 1-3, wherein the user profile includes an indication of previous suspicious activity in association with a first classification of purchase.

Clause 5. The method of clause 4, wherein determining that the attempted purchase is suspicious includes: determining that the classification of the attempted purchase matches the first classification; and determining that the amount of the attempted purchase falls within a predetermined range of amounts.

Clause 6: The method of any of clauses 1-5, wherein the attestation request further includes a request for an image of an invoice associated with the attempted purchase and the attestation data includes a digital image of an invoice obtained from the user device.

Clause 7: The method of clause 6, wherein determining that the attestation data shows that the attempted purchase comports with the purchasing policy includes: responsive to performing optical character recognition on the digital image of the invoice, identifying one or more purchased items; and determining that the one or more purchased items are not restricted by the purchasing policy.

Clause 8: The method of any of clauses 1-7, wherein the attestation data includes an email from a merchant associated with the attempted purchase.

Clause 9: The method of any of clauses 1-8, wherein determining that the attempted purchase is suspicious includes: receiving, from the user device, location data indicative of a location of the user; determining, based on the transaction authorization request, a location of a merchant associated with the attempted purchase; and determining, that the location of the user is more than a threshold distance away from the location of the merchant associated with the attempted purchase.

Clause 10: The method of any of clauses 1-9 further including receiving, via an API of a merchant associated with the attempted purchase, additional purchase data associated with the attempted purchase, the additional purchase data including a list of one or more items or services and respective costs of each of the one or more items or services.

Clause 11: The method of clause 10, wherein determining that the attempted purchase is suspicious further includes determining that at least one item or service of the one or more items or services is listed as prohibited by the purchasing policy.

Clause 12: The method of any of clauses 1-12 further including receiving, via a software application executed on the user device and in response to the software application being used in association with the attempted purchase, additional purchase data associated with the attempted purchase, the additional purchase data including a list of items or services and respective costs of each.

Clause 13: A method of administering an organizational purchasing policy, the method including: receiving a purchasing policy; receiving, via a software application of a user device associated with a user, purchase explanation data, the purchase explanation data representing a purported reason that an attempted purchase made with a transaction card complies with the purchasing policy; receiving, from a merchant point-of-sale (POS) device, a transaction authorization request, the transaction authorization request including transaction authorization data associated with the attempted purchase made using the transaction card; determining, based on the transaction authorization data, purchase data including: an amount of the attempted purchase; and a classification of the attempted purchase; responsive to determining, based a comparison of the purchasing policy, the purchase data and the purchase explanation data, that the attempted purchase is suspicious, generating an attestation request for evidence sufficient to show that the attempted purchase comports with the purchasing policy; transmitting, to the user device, the attestation request; receiving, from the user device, attestation data; and responsive to determining that the attestation data indicates that the attempted purchase comports with the purchasing policy, transmitting, to the transaction terminal, a transaction authorization approval to allow the attempted purchase.

Clause 14: The method of clause 13, wherein the purchase explanation data includes at least one from among an indication of an event, a list of participants, and an itemized list of expenses.

Clause 15: The method of clause 14, wherein determining that the attempted purchase is suspicious includes: determining an event location associated with the event; receiving location data from a plurality of mobile devices, wherein each of the plurality of the mobile devices is associated with an individual corresponding to the list of participants; and determining that one or more of the plurality of mobile devices was not present within a predetermined proximity of the event location within a time window associated with the event.

Clause 16. The method of clause 15 further including determining the event location and the time window from a calendar program associated with the user device.

Clause 17. The method of any of clauses 13-16 further including: determining a list of attendees to an event based on electronic RSVP responses to an electronic invite to the event, wherein each electronic RSVP corresponds to an attendee; and comparing the list of attendees to the list of participants.

Clause 18: The method of any of clauses 13-17 further including: receiving additional purchase data associated with the attempted purchase, the additional purchase data including an identification at least selected one item and an associated cost; and responsive to determining, based on a comparison of the purchasing policy, the purchase data, additional purchase data and/or the purchase explanation data, that the associated cost of the at least one selected item is above a predetermined threshold associated with the classification of the attempted purchase, transmit, to the user device, an alternative purchase recommendation representing an alternative item that may be purchased for less than the associated cost of the at least one selected item.

Clause 19: A method of administering an organizational purchasing policy, the method including: receiving a purchasing policy; receiving, from a transaction terminal, a transaction authorization request, the transaction authorization request including transaction authorization data associated with an attempted purchase made using a transaction card; determining, based on the transaction authorization data, purchase data including: an amount of the attempted purchase; and a classification of the attempted purchase; receiving a user profile corresponding to a user, the user profile being associated with the transaction card, the user profile including data representative of past purchasing behavior of the user; responsive to determining, based a comparison of the purchasing policy, the purchase data and the user profile, that the attempted purchase is suspicious, generating an attestation request including a request for evidence sufficient to show that the attempted purchase comports with the purchasing policy and an authentication request to authenticate the user; transmitting, to a user device associated with the user, the attestation request and the authentication request; receiving, from the user device, attestation data and authentication data; and responsive to determining that the attestation data indicates that the attempted purchase comports with the purchasing policy and that the authentication data authenticates the user, transmitting, to the transaction terminal, a transaction authorization approval to allow the attempted purchase.

Clause 20: The method of clause 19, wherein the authentication data includes biometric data of the user obtained by the user device; and determining that the authentication data authenticates the user includes comparing the biometric data of the user obtained by the user device to stored biometric data associated with the user.

Clause 21: A non-transitory computer readable medium having stored thereon computer program code that, when executed by a processor, instructs the processor to perform the method of any of clauses 1-20.

A system including a processor and the non-transitory computer-readable medium of clause 21.

Example Use Case

The following example use case describes an example of a use of systems and methods for performing real-time purchasing policy verification. This example use case is intended solely for explanatory purposes and not for limitation. In one case, a user initiates a purchase at a merchant using a company credit card. Accordingly, the merchant transmits an authorization request to an issuing bank. The company credit card may be subject to a purchasing policy that is monitored by the issuing bank. Furthermore, the issuing bank may maintain a user profile detailing past purchases and past violations of the purchasing policy. When the authorization request is received, the issuing bank analyzes the request and compares it to the purchasing policy and the user profile. Based thereon, the issuing bank may determine if the authorization request is suspicious. If the request is suspicious, the issuing bank requests attestation information from a user device of the user. For example, the issuing bank may request an invoice image to confirm that the purchased items/services comport to the purchasing policy. When the attestation information is received from the user device, the issuing bank analyzes the attestation information to determine whether to authorize the transaction. If the attestation information is insufficient, the issuing bank may submit an alternative payment authorization request to the user device. The user may then decide whether the transaction should proceed with a personal payment account of the user.

What is claimed is:

1. A method of administering an organizational purchasing policy, the method comprising:
   receiving a purchasing policy;
   receiving, from a transaction terminal, a transaction authorization request, the transaction authorization request including transaction authorization data associated with an attempted purchase made using a virtual transaction card, wherein the transaction authorization data comprises a transaction identification code of a first format;
   converting the transaction identification code of the first format into transaction information of a second format, wherein the transaction information comprises a merchant location;
   receiving a user profile corresponding to a user, the user profile being associated with the virtual transaction card and comprising data representative of past purchasing behavior of the user and past potential violations of the purchasing policy by the user;
   receiving location data of a user device associated with the user;
   determining, based on the location data, whether the user device is within a predetermined proximity of the merchant location;
   responsive to determining that the attempted purchase is potentially unauthorized, based on the determining of whether the user device is within the predetermined proximity of the merchant location and a comparison of the purchasing policy, the past purchasing behavior of the user, and the past potential violations of the purchasing policy, generating an attestation request comprising a request for evidence sufficient to show that the attempted purchase comports with the purchasing policy;
   transmitting, to a communication interface of the user device associated with the user, the attestation request comprising a request for an image of an invoice associated with the attempted purchase, and the attestation request instructing the user device to execute an application prompting the user for the image;
   receiving, from the communication interface of the user device, attestation data, the attestation data comprising a digital image of an invoice obtained from the user device;
   analyzing the digital image by performing optical character recognition on the digital image of the invoice, to identify one or more purchased items;
   determining whether the one or more purchased items are not restricted by the purchasing policy;
   responsive to determining that the one or more purchased items are not restricted by the purchasing policy:
      transmitting, to the communication interface of the user device, a first policy status labeling the attempted purchase as comporting with the purchasing policy and a first message indicating the attempted purchase may be completed through a business account associated with an employer of the user; and
      automatically transmitting, to the transaction terminal, a transaction authorization approval instructing the transaction terminal to route the attempted purchase through the business account associated with the employer of the user; and
   responsive to determining that the one or more purchased items are restricted by the purchasing policy:
      transmitting, to the communication interface of the user device, a second policy status labeling the attempted purchase as not comporting with the purchasing policy, a second message indicating the attempted purchase may be completed through a personal payment account of the user, and a first user input to enable the user to approve processing the attempted purchase through the personal payment account of the user;
      receiving, via the communication interface of the user device, a first selection of the first user input, the first selection comprising an approval to process the attempted purchase using the personal payment account of the user; and
      transmitting, to the transaction terminal, an alternative transaction authorization approval instructing the transaction terminal to route the attempted purchase through the personal payment account of the user.

2. The method of claim 1, further comprising:
   receiving, via the communication interface of the user device, a second selection of the first user input, the second selection comprising a rejection to process the attempted purchase using the personal payment account of the user; and responsive to receiving the second selection from the communication interface of the user device, transmitting, to the transaction terminal, a transaction authorization rejection to deny the attempted purchase.

3. The method of claim 1, wherein the user profile comprises an indication of previous suspicious activity of the user in association with a first classification of purchase.

4. The method of claim 3, wherein the transaction authorization data further comprises an amount of the attempted purchase and a classification of the attempted purchase, and wherein determining that the attempted purchase is potentially unauthorized is further based on:
   determining that the classification of the attempted purchase matches the first classification; and
   determining that the amount of the attempted purchase falls within a predetermined range of amounts.

5. The method of claim 1, wherein the attestation data comprises an email from a merchant associated with the attempted purchase.

6. The method of claim 1 further comprising receiving, via an API of a merchant associated with the attempted purchase, additional purchase data associated with the attempted purchase, the additional purchase data comprising a list of one or more items or services and respective costs of each of the one or more items or services.

7. The method of claim 6, wherein determining that the attempted purchase is potentially unauthorized is further based on determining that at least one item or service of the one or more items or services is listed as prohibited by the purchasing policy.

8. The method of claim 1 further comprising receiving, via a software application executed on the user device and in response to the software application being used in association with the attempted purchase, additional purchase data associated with the attempted purchase, the additional purchase data comprising a list of items or services and respective costs of each.

9. A method of administering an organizational purchasing policy, the method comprising:
   receiving a purchasing policy;
   receiving, via a software application of a user device associated with a user, purchase explanation data, the purchase explanation data representing a purported reason that an attempted purchase to be made with a transaction virtual card complies with the purchasing policy;
   receiving, from a transaction terminal, a transaction authorization request, the transaction authorization request including transaction authorization data associated with the attempted purchase made using the transaction virtual card, wherein the transaction authorization data comprises a transaction identification code of a first format;
   determining, based on the transaction authorization data, purchase data comprising:
      an amount of the attempted purchase; and
      a classification of the attempted purchase;
   converting the transaction identification code of the first format into transaction information of a second format, wherein the transaction information comprises a merchant location;
   receiving location data of the user device;
   determining that the attempted purchase is suspicious by determining, based on the location data, that the user device is not within a predetermined proximity of the merchant location;
   responsive to determining that the attempted purchase is suspicious, generating an attestation request for evidence sufficient to show that the attempted purchase comports with the purchasing policy;
   transmitting, to the user device, the attestation request;
   receiving, from the user device, attestation data;
   determining whether the attestation data indicates that the attempted purchase comports with the purchasing policy;
   responsive to determining that the attestation data indicates that the attempted purchase comports with the purchasing policy:
      transmitting, to a communication interface of the user device, a first policy status labeling the attempted purchase as comporting with the purchasing policy and indicating the attempted purchase may be completed through a business account associated with an employer of the user; and
      automatically transmitting, to the transaction terminal, a transaction authorization approval instructing the transaction terminal to route the attempted purchase through the business account associated with the employer of the user; and
   responsive to determining that the attestation data indicates that the attempted purchase does not comport with the purchasing policy:
      transmitting, to the communication interface of the user device, a second policy status labeling the attempted purchase as not comporting with the purchasing policy and indicating the attempted purchase may be completed through a personal payment account of the user, and a first user input to enable the user to approve processing the attempted purchase through the personal payment account of the user;
      receiving, via the communication interface of the user device, a first selection of the first user input, the first selection comprising an approval to process the attempted purchase using the personal payment account of the user; and
      transmitting, to the transaction terminal, an alternative transaction authorization approval instructing the transaction terminal to route the attempted purchase through the personal payment account of the user.

10. The method of claim 9, wherein the purchase explanation data comprises at least one from among an indication of an event, a list of participants, and an itemized list of expenses.

11. The method of claim 10, wherein determining that the attempted purchase is suspicious comprises:
   determining an event location associated with the event;
   receiving location data from a plurality of mobile devices, wherein each of the plurality of mobile devices is associated with an individual corresponding to the list of participants; and
   determining that one or more of the plurality of mobile devices was not present within a predetermined proximity of the event location within a time window associated with the event.

12. The method of claim 11 further comprising determining the event location and the time window from a calendar program associated with the user device.

13. The method of claim 10 further comprising:
determining a list of attendees to an event based on electronic reservation responses to an electronic invite to the event, wherein each electronic reservation corresponds to an attendee; and
comparing the list of attendees to the list of participants.

14. The method of claim 9 further comprising:
receiving additional purchase data associated with the attempted purchase, the additional purchase data comprising an identification of at least one selected item and an associated cost; and
responsive to determining, based on a comparison of the purchasing policy, the purchase data, the additional purchase data and/or the purchase explanation data, that the associated cost of the at least one selected item is above a predetermined threshold associated with the classification of the attempted purchase, transmitting, to the user device, an alternative purchase recommendation representing an alternative item that may be purchased for less than the associated cost of the at least one selected item.

15. A purchasing policy administration server for administering an organizational purchasing policy, the server comprising:
one or more processors; and
one or more memories having stored thereon instructions that, when executed by the one or more processors, controls the one or more processors to:
receive a purchasing policy;
receive, from a transaction terminal, a transaction authorization request, the transaction authorization request including transaction authorization data associated with an attempted purchase made using a transaction card, wherein the transaction authorization data comprises a transaction identification code of a first format;
convert the transaction identification code of the first format into transaction information of a second format, wherein the transaction information comprises a merchant location;
receive a user profile corresponding to a user, the user profile being associated with the transaction card, the user profile comprising data representative of past purchasing behavior of the user and past potential violations of the purchasing policy by the user;
receive location data of a user device associated with the user;
determine, based on the location data, that the user device is not within a predetermined proximity of the merchant location;
responsive to determining that the attempted purchase is suspicious, based on determining the user device is not within the predetermined proximity of the merchant location and a comparison of the purchasing policy, the past purchasing behavior of the user, and the past potential violations of the purchasing policy, generate an attestation request comprising a request for evidence sufficient to show that the attempted purchase comports with the purchasing policy and an authentication request to authenticate the user;
transmit, to a user device associated with the user, the attestation request and the authentication request;
receive, from the user device, attestation data and authentication data;
determine whether the attestation data indicates that the attempted purchase comports with the purchasing policy and that the authentication data authenticates the user;
responsive to determining that the attestation data indicates that the attempted purchase comports with the purchasing policy and that the authentication data authenticates the user:
transmit, to a communication interface of the user device, a first policy status labeling the attempted purchase as comporting with the purchasing policy and indicating the attempted purchase may be completed through a business account associated with an employer of the user; and
automatically transmit, to the transaction terminal, a transaction authorization approval instructing the transaction terminal to allow the attempted purchase through the business account; and
responsive to determining that the attestation data indicates that the attempted purchase does not comport with the purchasing policy or that the authentication data does not authenticate the user:
transmit, to the communication interface of the user device, a second policy status labeling the attempted purchase as not comporting with the purchasing policy and indicating the attempted purchase may be completed through a personal payment account of the user, and a first user input to enable the user to approve or reject processing the attempted purchase through the personal payment account of the user;
receive, via the communication interface of the user device, a first selection of the first user input, the first selection comprising a rejection to process the attempted purchase using the personal payment account of the user; and
transmit, to the transaction terminal, a transaction authorization rejection instructing the transaction terminal to deny the attempted purchase.

16. The server of claim 15, wherein
the authentication data comprises biometric data of the user obtained by the user device; and
determining that the authentication data authenticates the user comprises comparing the biometric data of the user obtained by the user device to stored biometric data associated with the user.

17. The method of claim 1, further comprising:
identifying in real-time, via a transaction listener, a primary account number (PAN) associated with the virtual transaction card; and
determining, via the transaction listener, whether the PAN comprises one or more fraud security digits.

18. The method of claim 17, wherein determining that the attempted purchase is potentially unauthorized is further based on determining that the PAN does not comprise the one or more fraud security digits.

19. The method of claim 1, wherein the first format comprises a raw data format and the second format comprises a human-readable data format.

* * * * *